US012226787B2

(12) United States Patent
Knight

(10) Patent No.: US 12,226,787 B2
(45) Date of Patent: Feb. 18, 2025

(54) PUMP DISPENSER AND CONTAINERS

(71) Applicant: RIEKE PACKAGING SYSTEMS LIMITED, Leicestershire (GB)

(72) Inventor: Simon Christopher Knight, Bridgend (GB)

(73) Assignee: RIEKE PACKAGING SYSTEMS LIMITED (GB)

( * ) Notice: Subject to any disclaimer, the term of this patent is extended or adjusted under 35 U.S.C. 154(b) by 184 days.

(21) Appl. No.: 16/301,649

(22) PCT Filed: May 15, 2017

(86) PCT No.: PCT/EP2017/061611

§ 371 (c)(1),
(2) Date: Nov. 14, 2018

(87) PCT Pub. No.: WO2017/198616

PCT Pub. Date: Nov. 23, 2017

(65) Prior Publication Data

US 2019/0118205 A1 Apr. 25, 2019

(30) Foreign Application Priority Data

May 16, 2016 (GB) .................................... 1608596

(51) Int. Cl.

*B05B 11/00* (2023.01)
*B05B 11/10* (2023.01)

(52) U.S. Cl.

CPC ........ *B05B 11/106* (2023.01); *B05B 11/1047* (2023.01); *B05B 11/1067* (2023.01); *B05B 11/1074* (2023.01)

(58) Field of Classification Search

CPC ............... B05B 11/106; B05B 11/1047; B05B 11/1067; B05B 11/1074; B05B 11/1001; B65D 1/0246

See application file for complete search history.

(56) References Cited

U.S. PATENT DOCUMENTS 3,913,772 A * 10/1975 Ochs .................. B65D 41/3404 215/256
4,524,888 A * 6/1985 Tada .................. B05B 11/0064 222/153.07

(Continued)

FOREIGN PATENT DOCUMENTS

JP 1993094149 U 12/1993
WO 2012001374 1/2012

(Continued)

OTHER PUBLICATIONS

Patent Cooperation Treaty (PCT), International Search Report and Written Opinion for Application PCT/EP2017/061611 filed May 15, 2017, mailed Sep. 11, 2017, International Searching Authority, EP.

*Primary Examiner* — Donnell A Long
(74) *Attorney, Agent, or Firm* — McDonald Hopkins LLC

(57) ABSTRACT

A pump dispenser comprising a container having a neck (6) to which the pump is attached. A pump body (1) has an outward flange (91) through which it is supported on the edge of the container neck (6). A body/neck rotation stop mechanism (64,7) is provided by an interlock engagement between the pump body and the container neck, and has widely-spaced interlock projections (64) on the container neck (6), e.g. one or two projections, each having a circumferentially-directed abutment face (642). A series of spaced interlock teeth (71) projects down from the outward flange (91) of the pump body and these have respective abutment faces (711) to engage the neck projections and limit relative rotation of the pump body and neck. This can assure reliable action of a plunger-locking mechanism of the dispenser.

12 Claims, 4 Drawing Sheets

(56) References Cited

U.S. PATENT DOCUMENTS

| | | | | | |
|---|---|---|---|---|---|
| 5,307,946 | A * | 5/1994 | Molinaro | B65D 41/47 | 215/256 |
| 5,401,148 | A * | 3/1995 | Foster | B05B 11/0064 | 417/547 |
| 5,445,299 | A * | 8/1995 | Harriman | B05B 11/106 | 222/321.9 |
| 5,615,806 | A * | 4/1997 | Grothoff | B05B 11/1023 | 222/384 |
| 6,367,641 | B1 * | 4/2002 | Garcia | B05B 11/1049 | 222/153.09 |
| 6,604,656 | B1 * | 8/2003 | Tseng | B05B 11/106 | 222/321.9 |
| 10,384,223 | B2 * | 8/2019 | Espinoza | B05B 11/106 | |
| 2008/0290119 | A1 * | 11/2008 | Tseng | B05B 11/1001 | 222/321.7 |
| 2011/0095055 | A1 * | 4/2011 | Kakuta | B05B 11/1046 | 222/321.9 |

FOREIGN PATENT DOCUMENTS

| | | |
|---|---|---|
| WO | 2014078478 | 5/2014 |
| WO | 2016009187 | 1/2016 |
| WO | 2016009192 | 1/2016 |

* cited by examiner

PUMP DISPENSER AND CONTAINERS

CROSS-REFERENCE TO RELATED APPLICATION

This application is a 35 U.S.C. 371 national stage filing of PCT Application No. PCT/EP2017/061611 filed on May 15, 2017, entitled "PUMP DISPENSER," which claims priority to Great Britain Application No. 1608596.1, filed on May 16, 2016, each of which are incorporated herein in their entirety by reference.

FIELD OF THE INVENTION

This invention has to do with pump dispensers of the type comprising a container for fluid product to be dispensed and a pump mounted in the neck of a container, usually by a discrete closure cap. Typically the pump has a plunger which operates in a pump body for pumping the product. Other aspects herein relate to containers with necks adapted for rotational locking to a component mounted thereon.

BACKGROUND

Typically the pump of a pump dispenser comprises a pump body defining a pump cylinder. The container is usually a plastic bottle, and has a neck with retaining formations e.g. a screw thread, snap ring, bead or groove. The pump body is usually mounted on the neck by a closure cap, usually a separate component, and typically with an outward flange of the pump body bearing down on the edge of the container neck. The closure cap fixes down onto the neck. The pump body extends down through the container neck into the container interior.

The pump body defines or incorporates a pump chamber with a pump inlet having an inlet valve. Usually a dip tube is provided extending down into the container from the pump inlet. A plunger component including a pump piston, a discharge channel, an outlet valve and a discharge nozzle is operable in the body to change the volume of the pump chamber. The user presses on top of the plunger head to reduce the pump chamber volume and expel product from the nozzle via a discharge valve. A pump spring urges the plunger towards the extended/upward position. When pressure on the plunger is released the spring pushes the plunger out/up, drawing more product into the pump chamber through the inlet valve. Usually the nozzle is part of a laterally-extending plunger head; the nozzle may project substantially radially or sideways from the plunger head.

Down-locking pumps are widely used, comprising locking formations which can couple between the plunger and the pump body to hold the plunger in its retracted (down) position, against the spring. This makes it compact for shipping. Down-locking is often by formations making a sloping cam or thread engagement between the plunger stem and the body. Or, the formations may make a simple rotational interlock without cam action. The down-locking formations may be external e.g. near where the stem emerges from the body, or recessed inside the body.

Such a dispenser construction is reliable and does not leak in normal usage or shipping. Increasingly however there has been a demand for dispensers to be shipped in a filled condition by ordinary post and in various packaging types, e.g. when mailing individually-purchased consumer products rather than commercial lots. This puts a high demand on "shippability" features such as lock-down and sealing. Under repeated shock, vibration and inversion the lock-down threads sometimes work loose so that the plunger rises slightly and product leaks into the packaging.

Our WO2016/009187 addresses this by providing the plunger and body with mutually engageable catch formations which engage selectively when the plunger and body reach a fully locked-down condition or position, to prevent or inhibit their relative rotation back away from the locked-down condition.

Our WO2016/009192 applies modifications to the closure cap holding the pump body onto the container neck, providing a securing mechanism comprising respective inter-engaging securing formations of the closure cap and neck—typically threads—to connect the cap fixedly to the neck at a final secured position, and an additional catch mechanism engageable between the cap and neck selectively in the final secured position to inhibit rotation of the cap away from the final secured position.

There is still room for improvement in achieving a catch construction providing on the one hand sufficient resistance to undoing of the pump mechanism in transit, and on the other hand enabling reliable and user-friendly release of the catch for use of the dispenser.

THE INVENTION

In a first general aspect, we propose a pump dispenser comprising a pump for dispensing fluid from a container having a neck to which the pump is attached, the pump comprising

- a pump body defining a pump chamber, and a plunger reciprocable relative to the pump body in a pumping stroke to alter the volume of the pump chamber;
- the pump body comprising an outwardly (radially outwardly) projecting locating formation engaging around the neck of the container, and a securing element, such as a closure cap, engageable with the neck by a securing mechanism, typically a threaded engagement with a thread on the neck, securable by relative rotation of the neck and securing element to a final secured position in which it holds the locating formation of the body in place relative to the neck;
- a lock mechanism comprising respective lock formations of the plunger and body, the lock mechanism having a locked condition in which the plunger is locked against reciprocation and an unlocked condition in which the plunger can reciprocate for pumping, and in which a release movement of the lock mechanism from the locked condition comprises a relative rotation of the plunger and pump body around an axis of the plunger;
- a catch mechanism comprising respective catch formations of the plunger and body which are engageable selectively in the locked condition of the lock mechanism to prevent or inhibit the release movement thereof;
- characterised by a body/neck rotation stop mechanism provided by an interlock engagement between the pump body and the container neck. Typically this rotation stop comprises or is provided by first and second interlock formations on the container neck and on the locating formation of the pump body, having respective circumferentially-directed abutment faces engageable in the assembled dispenser to limit or prevent the relative rotation of the body on the neck, at least in the direction corresponding to the release movement of the plunger lock mechanism. Preferably at least one and preferably all/both of the abutment faces have not just a circumferentially-directed component, but are substantially circumferentially directed (i.e. substantially perpendicular to the circumferential direction), e.g. by all or most of the abutment face area being inclined—if at all—at not more than 20° and preferably not more than 10° away from a radial plane. [This refers to inclination in a direction which would constitute a ramp for overriding of the abutment: inclination in the other direction, i.e. in-turning or overhang tending to draw the components together on abutment is permissible.] Desirably the abutment faces are radial or substantially radial faces i.e. perpendicular or substantially perpendicular to the circumferential direction. Desirably they are parallel to the neck axis. Desirably they are flat.

A further proposal is that in least one of the first and second interlock formations, one or more projections having respective abutment faces are adjacent one or more annular clearance or track segments, in axial register with the projection(s). Desirably, one or both of the first and second interlock formations is provided in an annular region of the corresponding component (neck or body) in which at least 50% of the angle subtended consists of such clearance or track segment, more preferably at least 80% or at least 90% and most preferably at least 95%. Alternatively stated, abutment face-bearing projection(s) of the formation subtend in total a minor part, preferably less than 10% and most preferably less than 5% of the annular region where the interlock formation is present, the rest constituting clearance segment(s) or track segment(s) where the interlock formation on the other component (around the body and neck edge) can be axially introduced—such as on an assembly line, where rotational alignment of components is unlikely—desirably without interfering and perhaps damaging the projections constituting the interlock formations, the abutment faces or the edges thereof. Generally this means that abutment face-bearing projections in this one of the first and second interlock formations are few and/or circumferentially small. Desirably there are not more than 10, preferably not more than 5 e.g. one, two or three projections. If more than one, preferably they are widely spaced around the interlock formation e.g. evenly spaced, such as at diametrically opposing parts.

Most preferably this is on the container neck component, e.g. there are two diametrically-opposed projections on the bottle neck, each with a circumferentially-directed abutment face as discussed above, and desirably without other such abutments between them, e.g. with uninterrupted track or clearance segment between them. Or, less preferably, there may be a single such projection. This preferred feature is also an independent general proposal herein for the formation of rotational lock formations on a bottle neck for restricting the relative rotation of a component, such as a pump body, mounted on or in the neck by a locating formation, and not necessarily restricted to the context of reacting to the release force of a locked plunger.

In relation to this feature/proposal, most plastics bottles are made by a blow moulding process. A hollow hot polymer parison is inflated inside a mould cavity defined between opposed mould parts ("halves") which are separable along a parting line or split line (usually planar) for subsequent removal of the formed bottle. The separation movement is naturally directly or perpendicularly away from the parting line, and the formed bottle including the neck region must pull free of the mould halves. With bottle necks having moulded circumferentially-local projections for rotational gripping or locking, such as circumferential teeth or nibs around the neck edge, it is generally known that those which project transversely to the separation direction (draw direction) of the mould halves must be pulled out from the corresponding intricate mould regions with some deformation, so they are usually either moulded as rounded forms to avoid damage, or else suffer damage.

We have found that by forming the one or more rotational lock projections selectively at one or both of the opposed regions of the neck which are most remote from the mould parting line, or alternatively stated, are facing outward substantially perpendicularly to the parting line, or alternatively stated again, are facing outward substantially in the draw direction, this compromise can be avoided and superior locking formations made. A side face (abutment face) of a projection formed at such a location is aligned with the draw direction and can be made flat or substantially flat e.g. in an axial plane, and can be directed perpendicular to the neck's outward surface e.g. circumferentially directed, without being damaged as the mould halves separate. An alternative procedure is to form the one or more rotational lock projections selectively at one or both of the opposed regions of the neck which are actually at the mould parting line, so that it/they need not be pulled out with deformation past a recess wall of the mould.

By then additionally and desirably not forming abutment projections on the neck at the compromised intervening positions, i.e. by providing large angular sectors of track or clearance there as described herein, it can be assured that it is the well-formed high-efficiency abutments which operate against the counter-formations of the other component, e.g. a pump body as described herein. These other formations can then likewise be formed flat or substantially flat e.g. in an axial plane, and can be directed perpendicular to the neck's outward surface e.g. circumferentially directed. Because such abutting circumferentially-directed surfaces do not generate outward force on the outer component tending to deform the components radially out of engagement, as rounded or outwardly-inclined surfaces do, they can provide high rotational security relative to their size. [As mentioned above one or both of the surfaces might even be inclined the other way relative to the tangent, i.e. so as to tend to produce an inward force on the projection of the outer component, provided that the projection can still be withdrawn from the mould. This possibility is also comprehended in the disclosure.] The neck wall need not be formed as thick as it has needed to be with known locking neck formations, so material can be saved.

The container used herein preferably has this feature and may be made as described, in all aspects of the dispenser disclosed. The method of making a container by blow moulding as described is a further aspect of our proposals. Preferably the neck is moulded integrally in one piece with the container, but it might alternatively be formed separately as a discrete finish component and then attached to a container body by any known means.

The other of the first and second formations (i.e. on the other of the body locating formation and container neck) also preferably comprises a substantial proportion of clearance or track segment, to accommodate abutment face-bearing projection(s) of the one component without interference. Again, preferably such clearance/track preferably subtends at least 50%, more preferably at least 70% or at least 80% of the angle of the annular region of the interlock formation. There is then a high probability that initial marrying of the components avoids clash of the interlock formations, which can then easily be rotated to engage. Conversely, it is preferred that the formations can be turned into engagement by only a minor rotation. So, preferably on at least one component plural abutment faces are provided, and separated by less than 100°, and preferably by less than 80°, or by less than 60°. There may be four to ten projections, for example. There may typically be more abutment faces in this other formation than in the first. The abutment faces (or projections bearing them) may be uniformly distributed around the formation. Or they may have varying spacing, e.g. in two or more sets spaced closer in the sets than between the sets.

Preferably the first interlock formation is provided at the edge of the neck. Desirably it is provided on the outside of the neck. Preferably the neck has a region of reduced thickness, where the interlock formation is provided by projections carrying abutment faces. These projections desirably do not project beyond the adjacent wall region of greater thickness; they may extend to the same radius. This region may be a step region around the edge of the neck.

Abutment face-bearing projections may be formed integrally in the material of the neck, e.g. as projecting block forms, desirably solid with the neck wall on two mutually transverse faces e.g. at the angle of a step formation as described, for strength.

Abutment face-bearing projections constituting the second interlock formation of the body/neck rotation stop are desirably downward projections from an outward flange constituting or comprised in the locating formation of the pump body, which overlies the container neck edge. [For convenience of description the neck is taken as opening upwardly; usually it does.] The second interlock formation is positioned in radial register with the first so that when the pump body and neck are moved axially together into position, the first and second interlock formations come into axial register, ready to prevent or limit rotation when their abutment faces engage.

A preferred form of container neck has a main wall region carrying an external thread or other securing formation for securing a closure cap that holds the body in place. It may have an inward step providing a reduced-thickness wall region around the neck edge and around which are distributed one or a few, e.g. two opposite as suggested above, projections carrying abutment faces, the remainder of the step region constituting one or more clearance or track segments. A set of circumferentially-spaced downward abutment face-bearing projections, projecting down from the outward flange of the pump body, can fit down into this circumferentially-large clearance while the projections on the neck end fit into corresponding clearances between the downward projections of the body flange. Desirably the abutment faces are axial and/or flat. The underside of the body flange may rest on the neck edge, directly or via a seal member. Preferably the body locating formation has a plug portion—e.g. a skirt depending from such an outward flange—which fits with interference into the top of the neck to form a seal. Tus, the flange carries the annular plug skirt and, spaced radially out from it, an annular series of the spaced downward abutment face-bearing projections. The neck edge fits closely up into the channel defined between these to abut the flange.

A closure cap element, with an internal thread and a central hole for projection of the top of the pump body, may screw or snap down to fix the pump body locating formation, e.g. outward flange, down onto the top of the neck. The closure cap may comprise a retaining band formation which surrounds the downward projections closely to prevent their deformation out away from the neck under load.

As described elsewhere, the pump body desirably provides part of the lock mechanism and catch mechanism for the pump plunger. Depending on the moment or torque required to release the catch mechanism, we note a tendency that when the plunger is forcibly turned to override the catch mechanism—usually with the user holding the container—there may be rotation of the pump body relative to the container which compromises the release action. The more positive the catch mechanism, the greater this risk. For example a catch mechanism of a plunger lock in the present proposals relying on a forcible plunger turn for release might require a turning force of 5 in-lbf [0.565 Nm] or more, or even 10 in-lbf [1.13 Nm] or more for release. The present proposals enable the internal dispenser structure and in particular the body-neck connection to withstand such torque so that it moves only the catch.

The present proposals prevent or limit pump body rotation, ensuring that the catch mechanism operates and is released as intended. By providing limited angular extent and large spacing of the interlock formations, they can be assembled easily without interference causing damage or tilting, and then turned easily (by movement of projections along the clearance or track segments as described) to an engaged position for use.

The catch mechanism for the plunger and body is not restricted in nature, and may be e.g. as any disclosed in our WO2016/009187.

In one general option a first said catch formation of the catch mechanism comprises a movable/deflectable element on one of the plunger head and pump body, having a first circumferentially-directed abutment surface, and the catch formation on the other of the plunger head and pump body has a corresponding oppositely circumferentially-directed abutment surface, said abutment surfaces being engageable to make a catch engagement to provide the engaged condition of the catch mechanism, and the catch engagement being releasable by movement of the movable element against a resilient force to move said abutment surfaces out of engagement.

In another option the catch mechanism comprises a movable/deflectable element on one of the plunger and pump body and a corresponding abutment shoulder on the other of the plunger and pump body, the movable/deflectable element and abutment shoulder being engageable to make a catch engagement, said movable element having a radially inner portion to engage the abutment shoulder and a radially outer portion comprising an actuation tab for finger pressure, the inner portion of the movable element extending out over the top surface of the pump body, and the radially outer portion with the actuation tab extending down the side surface of the pump body and at a spacing from the body surface, whereby inward pressing of the actuation tab moves the inner portion to release the engagement.

In another option one component (body or plunger) has a circumferentially-localised off-centre projection or abutment that engages into or behind a corresponding recess, shoulder or abutment of the other component to prevent or inhibit them from turning back again. A said formation on one component may flex or bend, optionally resiliently, in reaching the engagement position, e.g. it may flex to ride over or past the obstruction of the other component before relaxing back into the engaged (retained against rotation) condition. Thus, the body or plunger may carry a projecting element such as a tab, lug or flange, circumferentially localised or positioned at an appropriate position. This element or projection may be resiliently flexible inwardly or outwardly, or upwardly or downwardly, depending on the orientation of the corresponding abutment or recess on the other component.

The effect is to prevent or inhibit the onset of rotation, e.g. unscrewing, which would initiate release of the pump from its locked-down condition. The engagement requires an initial raised threshold turning force to be overcome before unlocking rotation begins, reducing the chance that this will happen in transit.

A variety of options exists for the nature, position and relation of the respective catch formations. Desirably they are integral formations with the respective components, e.g. a plunger head and a body top part (collar, cylinder body, cylinder insert or cap). Resilient flexibility is conveniently provided by forming a catch formation as an integral projection or integral portion of the plunger head or body portion. A predetermined direction of flexing can be provided by a generally flat or flattened form of such an integral projection. In the locked-down scenario, retention is often needed only in one rotational sense so a single circumferentially-directed retaining abutment may suffice; alternatively an opposed pair may be provided.

Desirably one formation has an abutment and also a slider, ramp or cam formation leading to the abutment over which the other component rides as it approaches the engagement position, where an edge or corresponding abutment on the other component comes into register with the abutment of the first component. As it rides over the ramp or cam it is deformed against resilience—preferably its own bending resilience, or that of the component of which it forms part or to which it is fixed—and then relaxes or clicks into place when the abutments come into register. Preferably one component formation is flexible and the other is substantially rigid where they meet. Or, both may flex. The direction of an abutment surface or shoulder may correspond to a direction in which the flexible element needs to be moved or guided, generally by hand such as by finger pressure, to release the engagement.

Since the catch mechanism may desirably release fully after its resistance has been overcome, e.g. after not more than a turn, or not more than half a turn, the engaging circumferentially-directed abutment desirably has only a small axial overlap so that it rapidly moves out of alignment on turning and does not engage again on the next turn. Where the catch mechanism has plural abutments distributed around the axis, desirably these engage not more than twice on turning and then move axially out of alignment, or they may engage only once. However in some embodiments a repeat of an abutting catch engagement can be useful, as described below.

A further proposal herein is that a lock-down formation on the pump body is provided on an exterior surface, especially on a radially-outwardly-directed surface, of the pump body, and is engaged by the corresponding lock-down formation (s) on an interior or radially-inwardly-directed surface of the pump plunger. This proposal is generally applicable in combination with other proposals herein. For example a pump body may have a top collar or boss portion projecting up with an outwardly-directed side surface, e.g. above a closure cap of the dispenser, and the body lock-down formation may be on this side surface. The plunger may have a plunger head with a downwardly-depending skirt—such as part of a shroud of the plunger head—and this may have an interior lock-down formation engageable with that on the body. These lock-down formations are preferably screw threads or other inclined cam portions Or, such threads or cams may be provided in female form on an inward surface of this top collar or boss portion, or recessed down inside the cylinder.

A catch formation of the catch mechanism may be or comprise an edge part of a radially-extending reinforcement rib or web on or in the underside of the plunger head. There may be two or more catch formations distributed circumferentially around the plunger head, e.g. each of them being or being on a respective reinforcement rib as described. The catch formation may be a straight radially-extending edge. It may move over an upper surface of the pump body beneath, e.g. of a top boss or collar as described, as the plunger turns. There may be plural, e.g. from 2 to 8, such formations distributed around the plunger.

A catch formation of the pump body may be provided as a recess and/or upward projection providing a circumferentially-directed abutment or engagement surface as mentioned before. This may be for example on a top or upwardly-directed surface of a pump body, such as on a pump body collar or boss as mentioned above. There may be plural e.g. 2 to 8 catch formations distributed around the pump body. The abutment surface may be provided as part of a directional protrusion or a ratchet tooth, having a ramp face and an abutment face on opposite sides. In one embodiment, typically when the catch formation is on a said upward surface of the pump body, the ramp surface is upwardly directed. It may require axial deformation or flexion of a corresponding catch formation of the plunger to ride over it into catch engagement. In another embodiment a directional protrusion or ratchet tooth is provided projecting radially from the body, e.g. at a raised portion, boss or lip adjacent an opening where the plunger stem emerges from the pump body. Such a radial ratchet tooth may have a ramp face which ramps progressively away from the pump axis to require radial deformation or flexion of the corresponding or complementary catch formation on the plunger. Again, there may be more than one such protrusion or ratchet tooth distributed around the pump body.

It is advantageous to cover the catch formations beneath the plunger head.

A further option is a bendable or foldable tab element as a catch formation on the plunger or pump body, preferably on the underside of the plunger e.g. on a rib or web as aforementioned, such as projecting from a lower edge thereof. The tab may bend around to a folded condition as it rides axially and rotationally into engagement against a counter-surface of the opposing component (plunger or body) e.g. acting as a pawl in relation to a directional abutment surface on the other component.

The intended action in preferred versions of these embodiments is that the user turns the plunger (usually by the head) to the locked condition and the turning action is sufficient to lead the catch formations, with any necessary sliding and deformation taking place automatically under the turning force, to their engaged position.

The body-neck locking proposals herein may be used in any kind of neck-mounted component or device such as a dispenser pump where it is desired to prevent or inhibit rotation of an element thereof which engages the neck.

The skilled person is able to design suitable variant constructions.

BRIEF DESCRIPTION OF THE DRAWINGS

Embodiments of our proposals are now described in detail with reference to the accompanying drawings, in which.

DETAILED DESCRIPTION

Firstly, general features of a pump are described.

Figure 1:
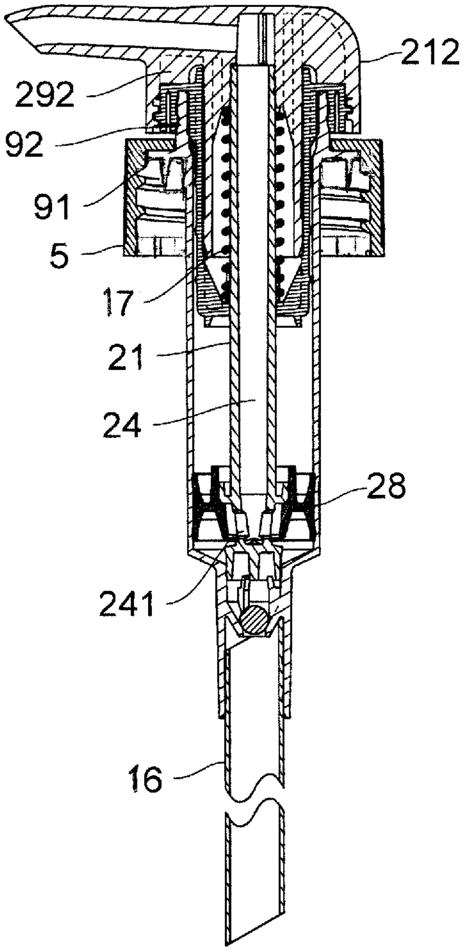
FIG. 1 is an axial cross-section through a pump dispenser, with the plunger in a retracted (locked down) position, showing the general components.
Figure 2:
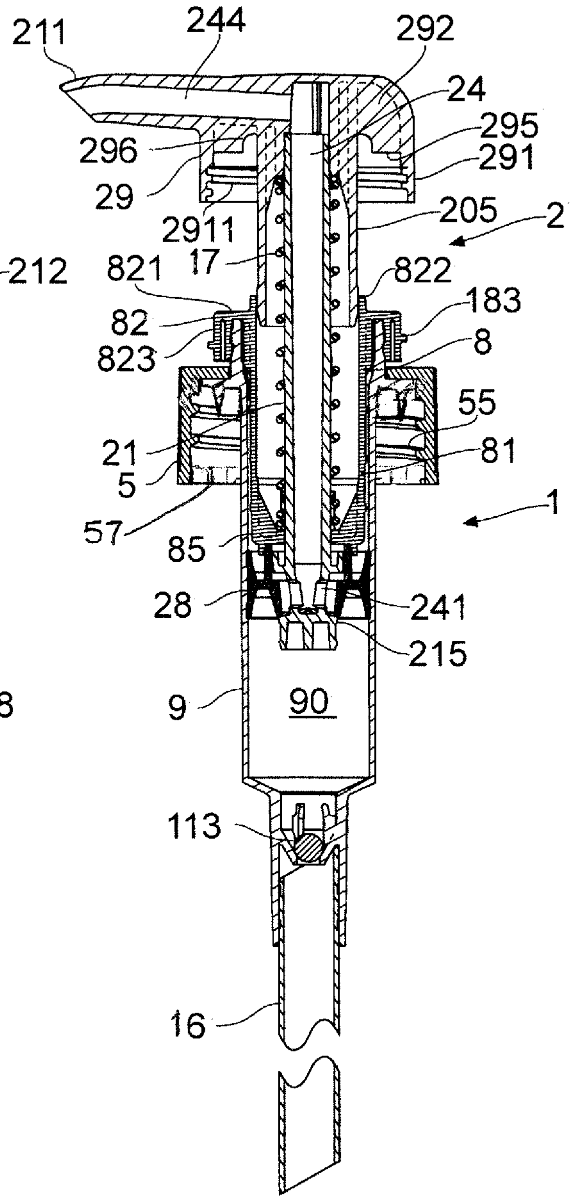
FIG. 2 is a similar view with the plunger in the extended position.

FIGS. 1 and 2 show a moveable-nozzle pump with lock-down capability: a type of pump with which the present proposals are implemented.

The pump has a body 1 and a plunger 2. A closure cap 5 with internal threads 55 is for mounting the pump on the neck of a container.

The body 1 comprises a cylinder component 9 and a body insert component 8. The cylinder component 9 has a top annular rim 92 projecting up through a hole in the cap 5 and a radial flange 91 engaged beneath the cap, so that the cap 5 clamps the flange 91 down against the top of the container neck in use. The main lower part of the cylinder component 9 projects down axially into the container interior, converging at its bottom end to define an inlet valve seat for an inlet valve 113 e.g. a ball valve, and a socket for a dip tube 16.

The body insert component 8 is also generally cylindrical in form and comprises an inner tubular part 81 and a top collar 82. The inner tubular part 81 fits down inside the body cylinder component 9 with a slight radial clearance (maintained by small protecting nibs), and has a partly closed bottom end 85 with a central opening for passage of the stem 21 of the plunger 2. The interior of the insert's bottom end 85 around this hole serves as a seat for the bottom end of a pump spring 17. At its top end the insert 8 has a radially projecting collar 82 with an upward surface or deck 821 facing up towards the head 29 of the plunger 2 and a downward peripheral skirt 823 formed in two generally concentric layers, the inner having snap formations for engaging onto the top rim projection 92 of the cylinder component 9, and the outer carrying an external lock-down thread 183. Adjacent the cylinder component top rim 92 the inner part of the insert component 8 has a circumferential series of short longitudinal fins 825. With the slight clearance between the two concentric walls of the collar skirt 823, which allows slight flexion of the inner wall with the snap formations, this fitting arrangement allows a tight snap fit between the body cylinder and insert components 8,9.

The plunger 2 has a stem 21 as mentioned, with a head 2' at the top having a laterally-directed nozzle 211. The head 29 has a shaped outer shroud 212 to provide user comfort, and an inner tubular downward extension 205 into which the stem 21 is plugged, with annular clearance between them along at least a portion of the extension and stem to receive and seat the top end of the pump spring 17. The outer shroud 212 has a cylindrical skirt portion 291 at its bottom edge, dimensioned to fit closely around the body collar 82 and having internal lock-down threads 2911 engageable with the external lock-down threads 183' of the collar 82 by turning the head 29. The head also features a set of internal reinforcing webs 292, each with a lower edge 295 forming a radial rib. When the plunger is screwed down onto the collar into the locked-down position shown in FIG. 1, these edges 295 act together as stop abutments against the flat top surface or deck 821 of the collar 82 so that the plunger cannot be over-tightened and cause damage. In this embodiment there are four reinforcing webs 292.

The plunger stem 21 defines an internal discharge channel 24 extending up from a set of generally radially-directed inlet openings 241 in the stem at its bottom end to a further discharge channel portion 244 through the nozzle 211 of the head 29. At the bottom of the stem 21 a piston 28 forms a sliding seal. The piston has a limited axial sliding movement relative to the plunger stem 21 between a closed position in which it closes off the inlet openings 241 (FIG. 2, where the piston is pushed to its lowest position relative to the stem 21 by abutment against the bottom end 85 of the insert component 8), and an open position in which it allows access to the openings 241 (FIG. 1 shows the piston 28 moved to this upper position relative to the stem 21). In the locked-down position (FIG. 1) an end plug portion 215 of the stem blocks the inlet valve conduit altogether, so that there is no flow through the pump. Outlet flow can occur only as the plunger is being depressed. The sliding seal piston 28 has the advantage that product cannot be expelled through the pump by squeezing the container, whatever the position of the plunger.

Figure 3:
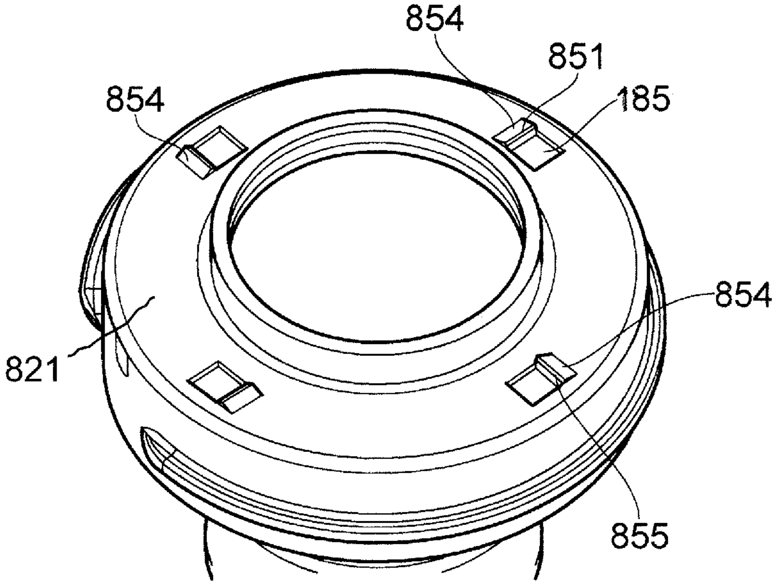
FIG. 3 shows the top of the pump body collar and FIG. 4 shows the underside of the plunger head, with features of a plunger catch mechanism.
Figure 4:
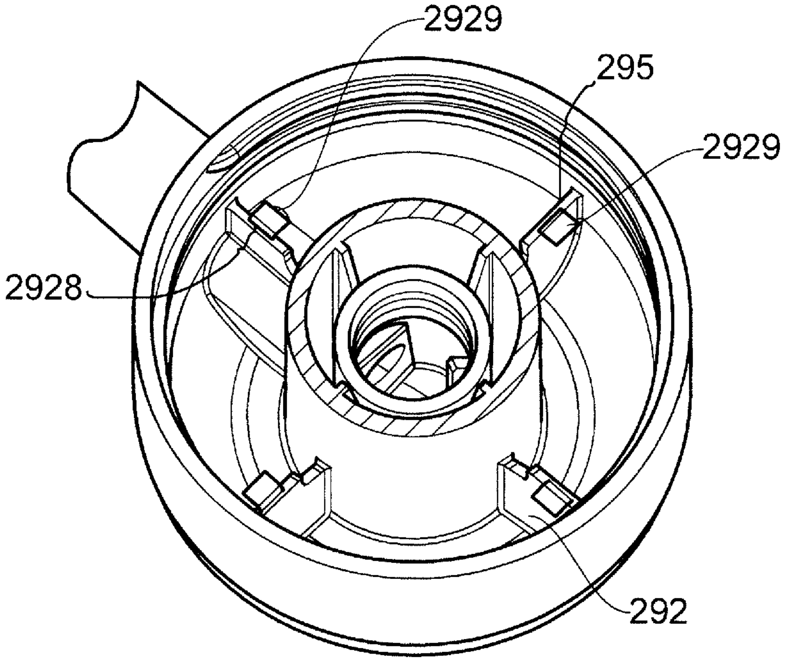
Figure 5:
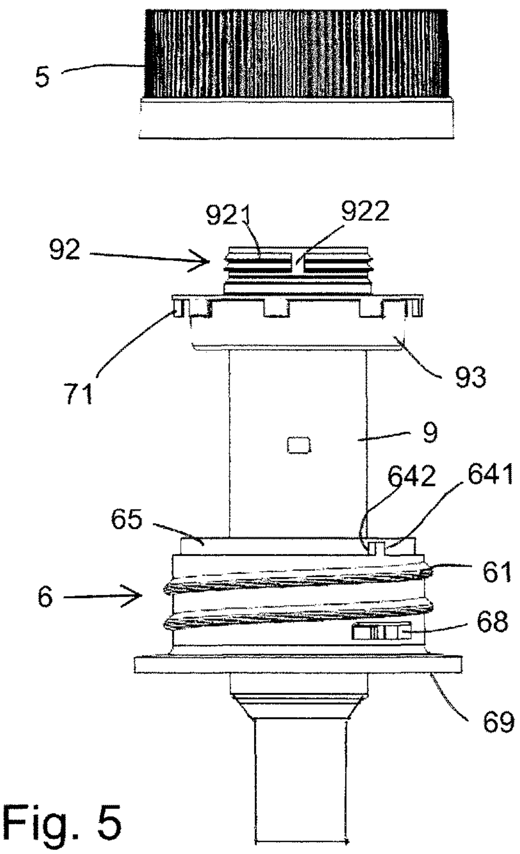
FIGS. 5 and 6 are exploded lateral and perspective views showing a pump body cylinder component, closure cap and threaded container neck finish of the dispenser (the rest of the container and pump being omitted for clarity)

FIGS. 3 and 4 show a catch mechanism. The underside of the plunger head 29 is provided with a plurality of catch formations by using the downward edges 295 or radial ribs of the internal plunger head reinforcement webs 292. The radial edges 295 are enhanced with thinner foldable tabs 2929 formed integrally with the webs. Correspondingly, the top surface or deck 821 of the pump body collar—see FIG. 4—has a set of four receiving pockets 185 spaced equidistantly around it, each wide enough to receive one of the plunger tabs 2929. Each receiving pocket 185 has an abrupt or perpendicular abutment surface 855 opposing the direction of unscrewing of the lock-down threads. The height of the abrupt abutment faces 855 is enhanced by building up from the surface of the deck a ratchet tooth formation 851 having the abrupt face 855 and a ramped face 854 directed in the opposite rotational direction. For locking down the pump plunger 2, e.g. for shipping, the plunger is rotated clockwise while being pushed down, to engage the lock-down threads 183,2911. As these move further into engagement, the projecting tabs 2929 gradually come into engagement with the top 821 of the body collar 82, sliding over its surface and progressively folding around the hinge regions 2928 where they join the more rigid reinforcing web 292 above. As lock-down approaches completion the four tabs just reach their assigned pockets 185, with the tabs 2929 then being folded flat to the deck 821. The ramp faces 854 help the tabs and to deform sufficiently to reach the pockets 185. The ends of the tabs then face the perpendicular abutment faces 855 of the respective pockets. From this position, unscrewing the lock-down of the plunger requires the tabs to be broken away from their corresponding rib edges or reinforcing webs which requires a substantial threshold turning force, providing an effective catch against accidental unlocking of the plunger.

The axial extent of the abutment engagements between the catch formations is small relative to the overall pitch of the lock-down threads so that even half a turn carries the catch formations out of axial register with one another. After the initial resistance offered by the catch mechanism, the lock-down is released against only the friction of the threads, without inconvenient intermittent extra resistance from the catch mechanism.

The skilled person will appreciate that the principles for making catch engagements and lock-down engagements embodied in the above examples may be embodied in numerous other ways without changing the nature of the invention, as explained in WO2016/009187 the entire disclosure of which is incorporated herein by reference.

FIGS. 5 to 12 exemplify a rotational stop feature embodying the present proposals and acting between the pump body and the container neck. The figures show the container neck portion 6, with an external thread 61 and an adjacent wall portion 69 (the rest of the container is omitted for clarity). The neck is generally cylindrical. It has a main wall 62 of a larger wall thickness, and adjacent its upper edge an inward step 66 of the outer surface leading to a reduced-thickness portion 63 at the edge. The overall thickness is conventional, however, e.g. the main wall being about 2.5 mm thick (excluding the thread). The reduced-thickness portion 63 and step 66 extend right around the neck edge except at two diametrically opposed positions where an integrally moulded outward projection 64, generally of block form and with oppositely circumferentially-directed flat faces 641, 642, interrupts the step. One face 642—the faces are in planes perpendicular to the circumference—constitutes an abutment face for the rotational stop. The projection 64 merges integrally into the wall at its bottom face and at its inner side, projecting neither above the edge nor radially outside the main wall thickness. As described previously, these projections are formed on the neck at the two opposed positions remote from the extrusion blow mould parting line, so that the abutment faces 642 lie in the draw direction and are kept clean and undamaged in moulding despite their sharp form. No abutment projections are formed in the intervening track or clearance segments 65 of the annular region above the step 66, which segments would lie closer to the mould parting line in manufacture.

The body component 1 defines a body cylinder 9 (in which a pump piston of the plunger operates in use), the top outward flange 91 and the upwardly projecting annular rim 92 extending above the flange for connection to the body collar (not shown in these figures). The cylinder component 1 fits down inside the neck 6 and is held in place by the closure cap 5, whose flat top wall 51 has a central opening 59 up through which the top connector 92 of the body component 1 projects (FIG. 3). The cap 5 has internal threads 55 which tighten down onto the neck threads 61; in this position (FIG. 4) the top outward flange 91 of the body component 1 lies down on the edge of the neck 6 and is clamped against it by the top wall 51 of the cap 5.

Figure 9:
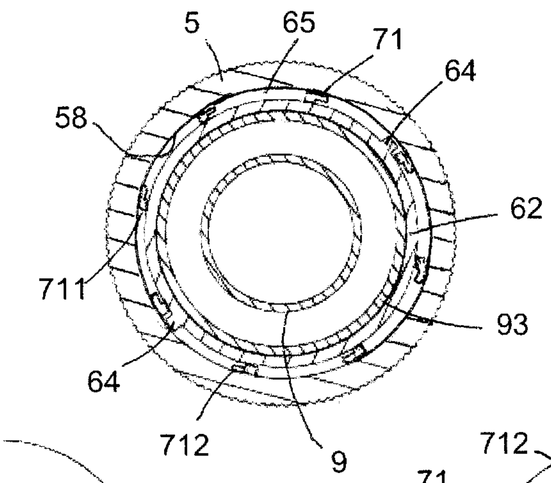
FIG. 9 is a cross-section through the assembly at IX-IX of FIG. 7.
Figure 10:
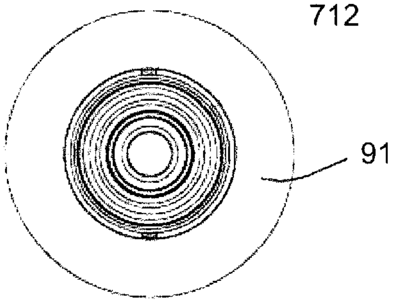
FIGS. 10, 11 and 12 are respectively a top view, bottom view and side elevation of the pump body cylinder component.
Figure 11:
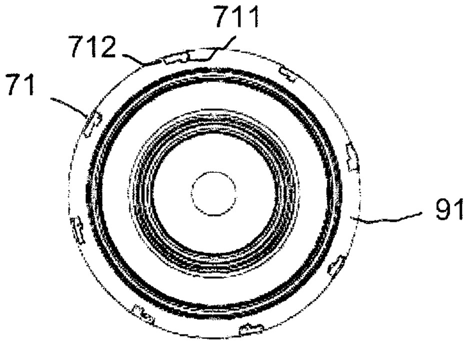
Figure 12:
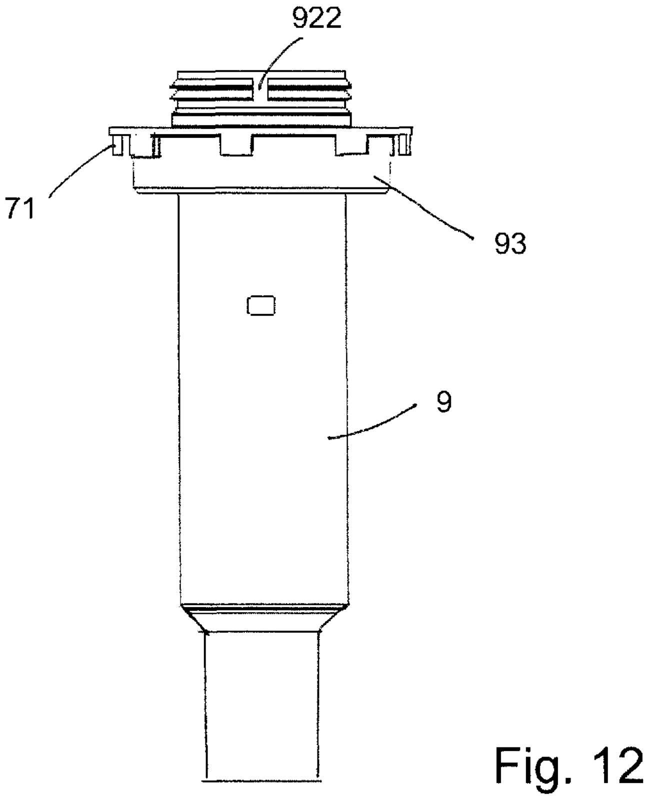

The underside of the flange 91 has characteristic formations. One is a downwardly-projecting sealing skirt 93, which plugs with interference into the reduced-thickness wall portion of the neck, and makes a seal for the container interior (obviating the conventional discrete sealing ring). Spaced outwardly of the sealing skirt 93, around the extreme periphery of the flange 91, is an interlock formation generally designated 7 and consisting of plural e.g. eight downwardly-projecting teeth 71, spaced evenly around the circumference, with clearances 72 between them which are larger than the teeth so that the teeth occupy less than 30% of the circumference: about 25% in this example). As seen in FIGS. 9 and 11, these interlock teeth have, facing anticlockwise, flat radial abutment faces 711, while the opposed part is a buttress portion 712 for mechanical strength. The exact form is not critical. The illustrated form shows a rear cutaway of the buttress portion to avoid a thick moulding. The buttress edge may be inclined rather than axial to help fill the mould cavity [not shown].

In an alternative embodiment [not shown] the downwardly-projecting teeth may be grouped in sets, e.g. as two widely spaced sets of three, rather than being all spaced evenly.

As the components are assembled axially together the downward teeth 71 of the flange 91 easily enter the large clearance segments 65 on the corresponding region of the bottle neck, with negligible risk of interference that might damage the abutment faces or cause tilting.

With the components assembled (FIGS. 7, 8) the long clearance segments 65 (FIG. 1) between the two neck projections 64 constitute tracks along which the body flange teeth 71 can move, in the anticlockwise direction, until an initial pair of them (after a rotation of less than $1/8^{th}$ of a turn) meet the abutment face 642 of the respective projection 64, symmetrically at opposite sides of the neck for stability and strength. The smaller angles between the teeth 71 reduce the turn angle needed to reach lock. The skilled person will understand that unlike the bottle neck, the body cylinder component 9 is moulded with axial relative movement of the mould, so that flat abutment faces perpendicular to the circumference can be made on any number of teeth 71 around the component 9. The abutment faces 642 of the two opposed neck projections 64 are the only abutments around the neck edge, so they both always engage. They are highly efficient, in that they have a low tendency to deform out of engagement by overriding—because their faces are accurately circumferentially-facing—and in that they are strong—being connected integrally into the neck wall at both the bottom and back of the step. That is, their rotational locking strength relative to their bulk is unusually high.

To strengthen the rotational lock further, the inner surface of the cap 5 near the top, where it surrounds the annular region of the locking formations 64,71, has a retaining band region 58 where the wall is thickened to bring the inner surface close in to the outer surfaces of the teeth 71 on the pump body flange. The retaining band region 58 strengthens the lock by preventing outward bending of the teeth 71, which would be a mode of possible failure. In trials we obtained body/neck lock failure strengths from 15 to 20 lb-f [1.7 to 2.25 Nm] and above with the forms shown, on a polypropylene pump body and HDPE blow moulded container with 2.5 mm neck wall.

The top collar 82 of the body insert component 8 (which makes a catch engagement with the plunger as shown above) snaps onto the top projecting rim 92 of the body cylinder component 9, which has snap ribs 921. These are interrupted by a pair of axial notches 922, engaged by corresponding axial ribs on the inside of the body collar 82 (not shown here) so that the components are locked together rotationally.

When the user holds the container and turns the locked-down plunger 2 anticlockwise to release it, the turning force applied by the user acts initially against the catch mechanism of the plunger lock, urging the body collar 81 anticlockwise as it reacts to the user force. The body collar/insert is rotationally locked to the body cylinder component 9 at the notch 922, as described (or in other embodiments may be in one piece with the body cylinder). For modest forces the friction in the assembly would normally resist movement sufficiently to provide a reaction allowing the catch to release. However in some cases, such as when the assembly is small or the threshold release force of the plunger catch is high for extra security, the body tends to turn relative to the container neck. In this case the present proposals operate: abutments between the body teeth 71 and the abutment projections 64 on the neck formation act to prevent any turning of the body relative to the container, so that the plunger catch release operates reliably.

Figure 6:
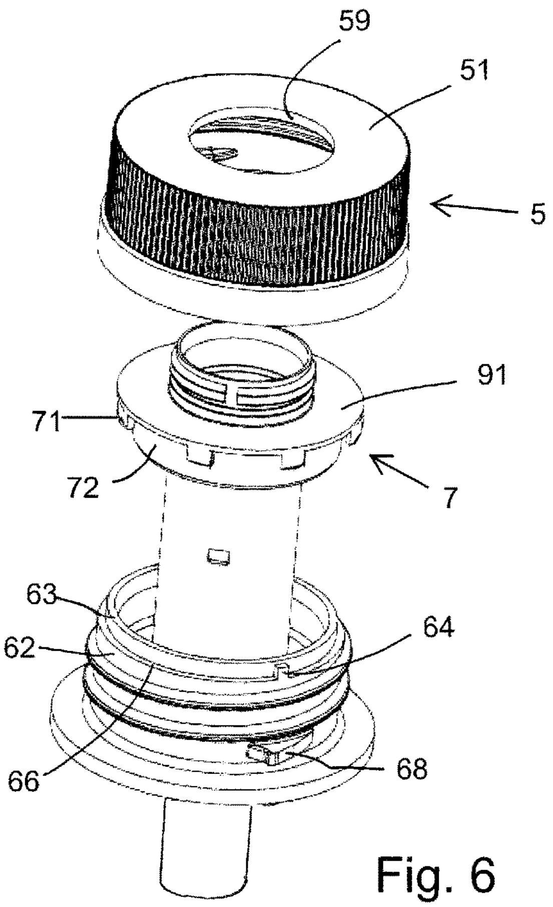
Figure 7:
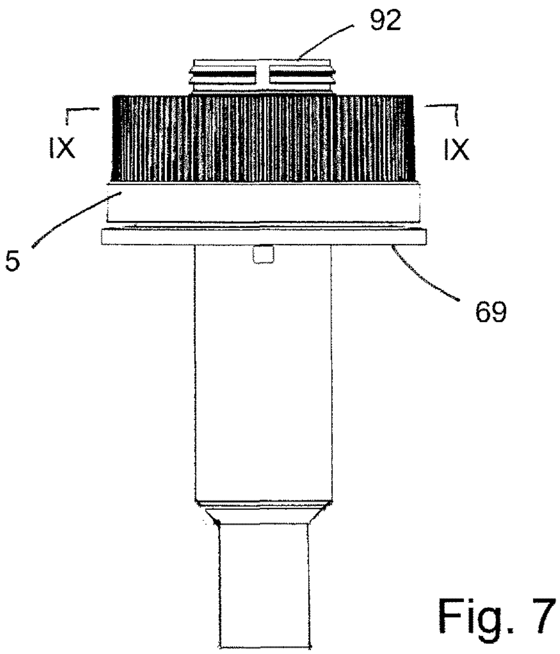
FIGS. 7 and 8 are an elevation and a cross-section of the components of FIG. 5 in the assembled position.
Figure 8:
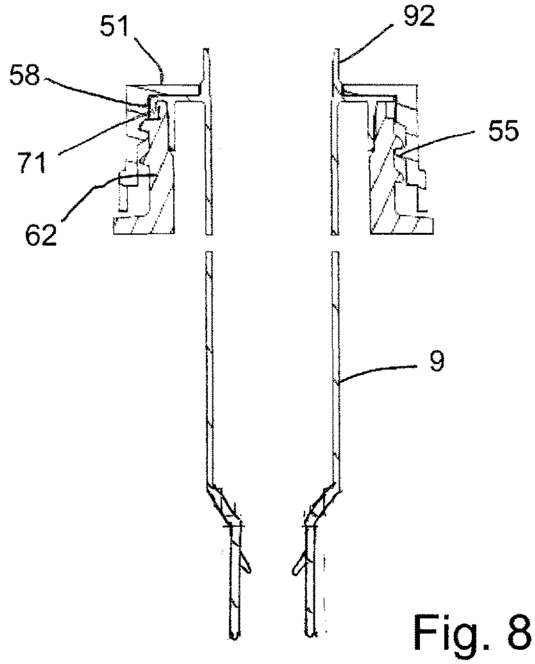

FIG. 6 shows a further optional enhancement, in the provision of a directional ratchet tooth 68 on the neck formation, which can interact with directional teeth 57—see FIGS. 1 and 2—around the inside of the bottom of the cap 5, so that the cap after being tightened is held against coming loose from the neck. Other ways of providing rotational locking of the cap to the neck are described in our WO2016/009192.

The invention claimed is:

1. Pump dispenser comprising a container for fluid to be dispensed and a pump for dispensing fluid from the container, the container having a neck to which the pump is attached and the pump comprising a pump body defining a pump chamber, the pump body having a locating formation engaging the container neck, and a plunger reciprocable relative to the pump body in a pumping stroke to alter the volume of the pump chamber;

a lock mechanism comprising respective lock formations of the plunger and pump body, the lock mechanism having a locked condition in which the plunger is locked against reciprocation and an unlocked condition in which the plunger can reciprocate for pumping, and in which a release movement of the lock mechanism from the locked condition comprises a relative rotation of the plunger and pump body around an axis of the plunger, and optionally also a catch mechanism comprising respective catch formations of the plunger and pump body which are engageable selectively in a locked condition of the lock mechanism, to prevent or inhibit the release movement thereof, and wherein: i) a body/neck rotation stop mechanism comprising a first interlock formation provided on the container neck and having a circumferentially-directed abutment face and a second interlock formation provided on the pump body and having a cooperating, circumferentially-directed abutment face, and ii) the first and second interlock formations are configured in an annular interface between the neck and the pump body so that, cumulatively, at least 80% of the annular interface consists of one or more clearance segments, said clearance segment(s) extending between the circumferentially-directed abutment faces of the first interlock formation and the second interlock formation so as to accommodate rotational movement of the first and second and interlock formations and to inhibit relative rotation between the container and the pump when the first and second interlock formations are engaged.

2. Pump dispenser of claim 1 wherein the second interlock formation is provided on the locating formation of the pump body.

3. Pump dispenser of claim 1 wherein at least 90% of the annular interface consists of said clearance segment.

4. Pump dispenser of claim 1 wherein the first interlock formation is provided at an edge of the neck.

5. Pump dispenser of claim 4 wherein the second interlock formation comprises downward projections from an outward flange comprised in the locating formation of the pump body, and which overlies the edge of the container neck.

6. Pump dispenser of claim 1 wherein the first interlock formation comprises not more than five abutment face-bearing projections formed integrally in the neck as projecting block forms.

7. Pump dispenser of claim 1 wherein in which the first interlock formation consists of two abutment face-bearing projections at diametrically opposed positions on the neck.

8. Pump dispenser of claim 1 wherein in which the plunger has a stem and laterally-projecting head, and having said catch mechanism in which the respective catch formations are on the head of the plunger and an external part of the pump body.

9. Pump dispenser of claim 1 wherein the lock mechanism comprises a threaded engagement between the plunger and the pump body, the lock formations being screw thread portions.

10. Pump dispenser of claim 1 wherein the lock mechanism is a lock-down mechanism having a locked condition at a fully retracted position of the plunger.

11. Pump dispenser comprising a pump for dispensing fluid from a container having a neck to which the pump is attached, the pump comprising a pump body defining a pump chamber;

a plunger having a stem and a head and being reciprocable relative to the pump body in a pumping stroke;

a catch mechanism comprising respective catch formations of the plunger and body which are engageable to prevent or inhibit a relative rotation of the plunger and pump body around an axis of the plunger, and wherein a said catch formation of the plunger head comprises a radially-extending element having a circumferentially-directed abutment surface, and a said catch formation on the pump body has an oppositely and circumferentially-directed abutment surface and a ramp formation over which the plunger head catch formation rides as they rotate towards engagement, with deformation of one or both of the catch formations against a resilient force, until the oppositely and circumferentially-directed abutment surface come into circumferential register and the deformation is relaxed on making engagement, and a body/neck rotation stop mechanism comprising first and second interlock formations respectively on the neck and on a locating formation of the pump body, each of the first and second interlock formations: i) spaced apart by clearance segments configured to avoid interference therebetween during connection of the pump to the container, and ii) having respective circumferentially-directed abutment faces engageable to limit the relative rotation of the pump body and the neck when the first and second interlock formations are engaged.

12. Pump dispenser of claim 11 wherein the first and second interlock formations of the body/neck rotation stop mechanism are configured so that clearance segments define at least 80% of an annular interface along which the first and second interlock formations are positioned.

* * * * *